United States Patent [19]

McGovern et al.

[11] Patent Number: 5,309,636
[45] Date of Patent: May 10, 1994

[54] METHOD FOR MAKING FILM COOLED SHEET METAL PANEL

[75] Inventors: Richard A. McGovern, Rockville; Stephen F. Phillips, East Hartford, both of Conn.

[73] Assignee: The United States of America as represented by the Secretary of the Air Force, Washington, D.C.

[21] Appl. No.: 477,355

[22] Filed: Jan. 19, 1990

[51] Int. Cl.⁵ .............................................. B23P 15/00
[52] U.S. Cl. ............................. 29/890.01; 29/890.142; 228/173.6
[58] Field of Search ......... 29/889.22, 890.01, 890.142; 228/173.6, 174

[56] References Cited

U.S. PATENT DOCUMENTS

| | | | |
|---|---|---|---|
| 3,995,422 | 12/1976 | Stamm | 60/757 |
| 4,050,241 | 9/1977 | DuBell | 60/757 |
| 4,318,965 | 3/1982 | Blair | 228/173.6 |
| 4,485,630 | 12/1984 | Kenworthy | 60/757 |
| 4,593,446 | 6/1986 | Hayner | 228/173.6 |
| 4,628,694 | 12/1986 | Kelm et al. | 60/752 |
| 4,726,735 | 2/1988 | Field et al. | 416/97 R |
| 4,843,693 | 7/1989 | Chisholm | 228/173.6 |

*Primary Examiner*—Stephen C. Bentley
*Attorney, Agent, or Firm*—Bobby D. Scearce; Donald J. Singer

[57] ABSTRACT

A method for fabricating a brazed sheet metal panel for use in an engine nozzle structure is described which comprises steps of providing a first sheet metal member having a plurality of spaced dimples formed therein and a second sheet metal member having a plurality of spaced cutouts corresponding in position to the spaced dimples in the first member, providing a mixture of powdered braze material and polymer binder and spraying a layer of the mixture onto a surface of the second member, assembling the first and second members in laminar contact with the cutouts of the second member in registration with the dimples of the first member and the layer of mixture between the members, and then heating the assembly under vacuum to a temperature sufficient to fuze the braze powder and to volatilize the binder.

1 Claim, 1 Drawing Sheet

METHOD FOR MAKING FILM COOLED SHEET METAL PANEL

RIGHTS OF THE GOVERNMENT

The invention described herein may be manufactured and used by or for the government of the United States for all governmental purposes without the payment of any royalty.

BACKGROUND OF THE INVENTION

The present invention relates generally to brazing methods and more particularly to a method for brazing a pair of sheet metal layers in the fabrication of a cooled sheet metal panel for use in an engine nozzle structure.

In advanced engine nozzles, the sheet metal walls must be cooled. Existing methods for brazing sheet metal members together in the fabrication of the nozzle wall structure have suffered from problems associated with maintaining satisfactory registration of the two sheet metal members during brazing, effecting a satisfactory continuous braze joint, and at the same time preventing flow of fused braze material from deleteriously affecting structure of the brazed wall assembly.

The invention substantially solves or reduces in critical importance problems with existing methods by providing a method for making a brazed sheet metal panel of particular utility in engine nozzle structures, wherein braze material powder carried in a polymer binder is sprayed to preselected surface density onto one wall member layer and the two layers then held in contact while being heated in a vacuum furnace at appropriate preselected brazing temperature.

It is therefore a principal object of the invention to provide an improved brazing method for joining two sheet metal members.

It is a further object of the invention to provide a brazing method for fabricating a cooled sheet metal panel for use in an engine nozzle structure.

These and other objects of the invention will become apparent as the detailed description of representative embodiments proceeds.

SUMMARY OF THE INVENTION

In accordance with the foregoing principles and objects of the invention, a method for fabricating a brazed sheet metal panel for use in an engine nozzle structure is described which comprises the steps of providing a first sheet metal member having a plurality of spaced dimples formed therein and a second sheet metal member having a plurality of spaced cutouts corresponding in position to the spaced dimples in the first member, providing a mixture of powdered braze material and polymer binder and spraying a layer of the mixture onto a surface of the second member, assembling the first and second members in laminar contact with the cutouts of the second member in registration with the dimples of the first member and the layer of mixture between the members, and then heating the assembly under vacuum to a temperature sufficient to fuze the braze powder and to volatilize the binder.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
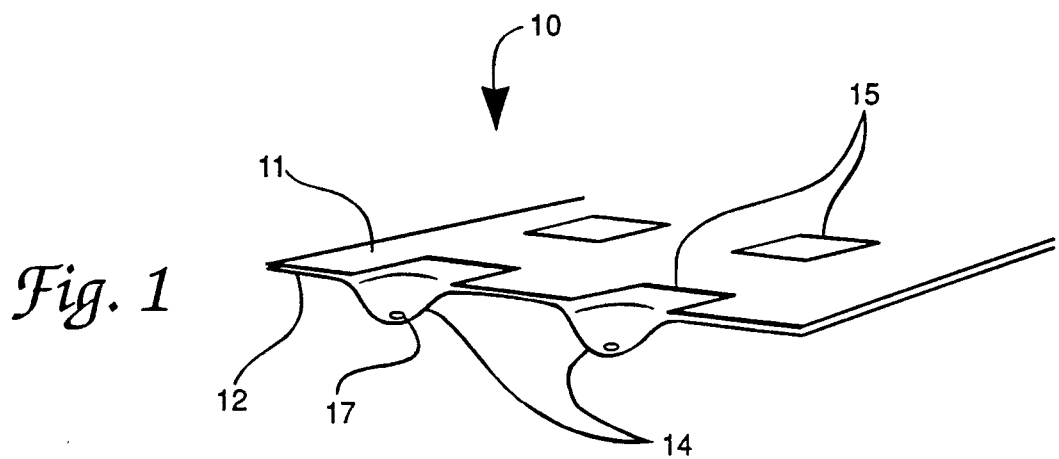
FIG. 1 shows an engine nozzle wall structure fabricated according to a conventional method.

Referring now to the drawings, FIG. 1 shows an engine nozzle wall structure 10 fabricated according to a conventional method. Structure 10 may typically comprise a first sheet metal layer 11 for exposure to hot gaseous flow in the engine brazed in laminar relationship to a second sheet metal layer 12 as the outer cooler wall component. Layer 11,12 are typically about 0.024 inch thick and 0.009 inch thick, respectively, and may comprise substantially any high temperature alloy suitable for the intended purpose and which can be brazed, such as Haynes 230 nickel alloy (22Cr, 14W. 2Nb, 0.3A1, 0.02La. 0.005B). Layer 12 has a plurality of dimples 14 which in the assembled condition for layers 11,12 are disposed in registration with cutouts 15 in layer 11. Each dimple 14 has a cooling hole 17 (typically 0.020 inch) for passage of fluid coolant in conventional manner through the thickness of wall structure 10. For effective operation of an engine nozzle including wall structure 10, layers 11,12 must be cooled, which presents assembly problems since laminar contact of layers 11,12 must be virtually complete and registration of dimples 14 and cutouts 15 must be precise. In brazing layer 11 to layer 12 by conventional methods, holes 17 are susceptible of being filled with braze and layers 11, 12 may not fit intimately because of inaccuracies in registration of dimples 14 with cutouts 15; in addition, layers 11,12 are usually of materials typically difficult to braze to a substantially continuous joint.

The invention may be best illustrated by reference to FIGS. 2 and 3 which respectively show exploded and sectional views of a wall structure 20 assembly fabricated according to the invention. Sheet metal layers 21, 22 serve functions and comprise materials similar to respective layers 11,12 of wall structure 10 of FIG. 1. Layer 21 has cutouts 25 which in the assembled condition of layers 21,22 register with dimples 24 having cooling holes 27 in layer 22. In assembling and brazing layers 21,22 together, a mixture of selected braze powder of suitably small sieve size is mixed with a polymer binder and sprayed as a thin layer 28 onto layer 21 at surface 29 thereof which confronts layer 22 in an assembled condition. The density (weight per unit area) of braze and polymer mixture applied to surface 28 is critical. A suitable braze material includes nickel-chromium-silicon (71%, 19%, 10%) braze powder AMS 4782 (Aerospace Material Specification). Suitable polymer binders include Nicrobraz "500" (Wall Colmonoy Corp). Other braze materials and polymer binders may be selected depending on the materials comprising layers 21,22, as would occur to one skilled in the art guided by these teachings. In demonstration of the invention, a mixture of AMS 4782 (−140 mesh US sieve) was mixed with Nicrobraz "500" polymer material in about a 3:2 volume ratio and airsprayed (about 50 psi) onto surface 29 to a thickness of about 0.010 to 0.013 inch. Braze powder mesh size is not strictly critical although −140 mesh is preferable. The pressures on the spray gun cannisters containing braze material and polymer were individually controllable in order to maintain a selected braze/polymer mixture and to apply to surface 29 a layer 28 density generally less than about 0.4 gm/in$^2$ and preferably in the range of about 0.34 to 0.36 gm/in$^2$ of braze material.

Figure 2:
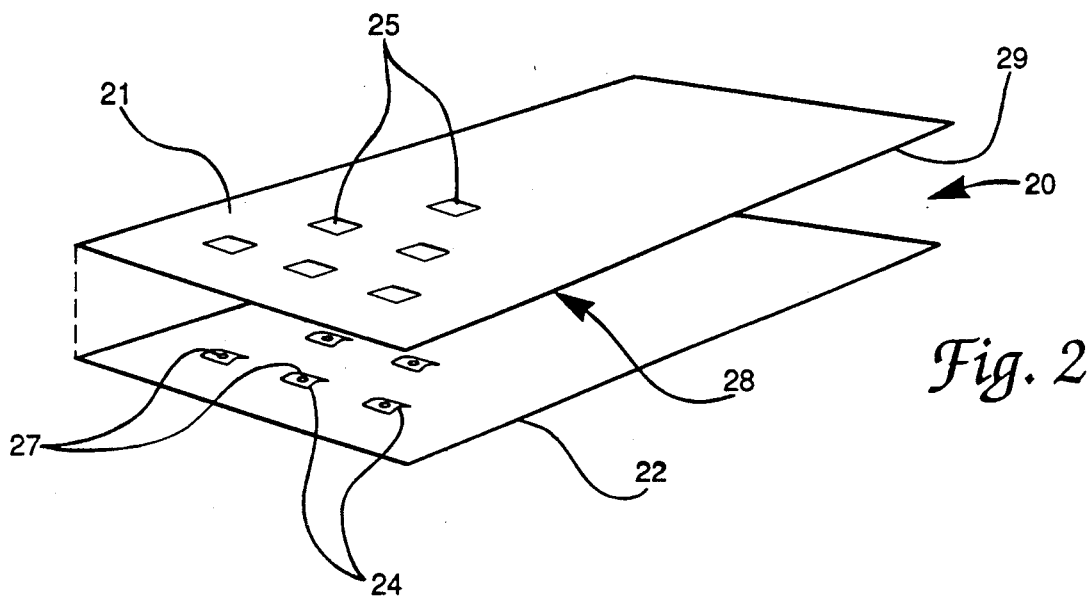
FIG. 2 shows an exploded view of a wall structure fabricated according to the method of the invention.
Figure 3:
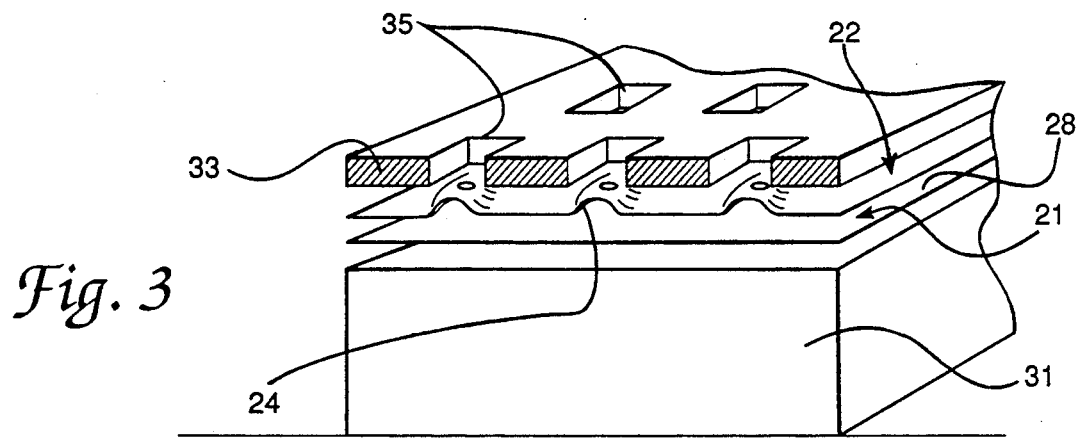
FIG. 3 shows a view in section of the assembled wall structure of FIG. 2.

Referring now to FIG. 3 shown therein is a view in section of the assembled wall structure depicted in FIG. 2. Doweling, tack welding and the like, confined generally to one end of the assembly of layers 21, 22 to allow for thermal expansion during the brazing operation, were used to ensure surface contact of layers 21,22 with sprayed layer 28 therebetween. The assembly of layer 21 with layer 28 was placed on a graphite block 31 coated with a boron nitride anti-braze barrier layer. A deadweight metal plate 33 having perforations 35 therein in registration with dimples 24 and cutouts 25 was placed atop the assembly to hold layers 21,22 together; the assembly was heated to the appropriate braze temperature (about 2150° F. for 7 minutes in the demonstration) in a vacuum furnace in order to volatilize the binder and to fuse the braze material to perfect the joint between layers 21,22.

An important aspect of the brazing procedure according to the invention is the application of the braze to the sheet metal layer defined and configured as layer 21 with cutouts 25, which ensures proper placement of the braze between layers 21,22 without use of masks or the like, and avoids subsequent runover of fused braze material into cooling holes 27 in dimples 24, precise fit of the components through careful manufacture thereof, such as on common die punch and cutting machines, is desirable to ensure a complete and satisfactory braze joint between layers 21,22.

The invention therefore provides a method for making a brazed sheet metal panel of particular use in an engine nozzle structure. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:

1. A method for fabricating a brazed sheet metal panel for use in an engine nozzle structure, comprising the steps of:
    (a) providing first and second sheet metal members, said first member having formed therein a plurality of spaced dimples, said second member having a plurality of spaced cutouts corresponding in position to said spaced dimples in said first member;
    (b) providing a mixture of powdered braze material and polymer binder;
    (c) spraying a layer of said mixture of braze material and binder onto a surface of said second member;
    (d) assembling said first and second members in laminar contact with said cutouts of said second member in registration with said dimples of said first member and said layer of said mixture between said first and second members;
    (e) heating said assembly under vacuum to a temperature sufficient to fuze said braze powder and to volatilize said binder.

* * * * *